United States Patent
Wilson et al.

(10) Patent No.: US 7,921,910 B2
(45) Date of Patent: Apr. 12, 2011

(54) TAGGED PROPPING AGENTS AND RELATED METHODS

(75) Inventors: Brett A. Wilson, Lafayette, LA (US); Robert Duenckel, Southlake, TX (US); Thomas C. Palamara, Eufaula, AL (US)

(73) Assignee: Carbo Ceramics Inc., Houston, TX (US)

( * ) Notice: Subject to any disclaimer, the term of this patent is extended or adjusted under 35 U.S.C. 154(b) by 246 days.

(21) Appl. No.: 11/667,324

(22) PCT Filed: Mar. 22, 2005

(86) PCT No.: PCT/US2005/009511
§ 371 (c)(1),
(2), (4) Date: May 8, 2007

(87) PCT Pub. No.: WO2005/100746
PCT Pub. Date: Oct. 27, 2005

(65) Prior Publication Data
US 2008/0210421 A1    Sep. 4, 2008

(51) Int. Cl.
*E21B 49/08*    (2006.01)
*E21B 47/00*    (2006.01)
*E21B 43/267*    (2006.01)

(52) U.S. Cl. ............. 166/250.12; 166/252.6; 166/280.2

(58) Field of Classification Search .......................... None
See application file for complete search history.

(56) References Cited

U.S. PATENT DOCUMENTS

| 4,879,181 | A  |   | 11/1989 | Fitzgibbon |
| 5,182,051 | A  | * | 1/1993  | Bandy et al. .................. 252/645 |
| 5,243,190 | A  |   | 9/1993  | Bandy et al. |
| 6,691,780 | B2 |   | 2/2004  | Nguyen et al. |
| 2003/0196799 | A1 |   | 10/2003 | Nguyen et al. |
| 2004/0129923 | A1 |   | 7/2004  | Nguyen et al. |
| 2004/0162224 | A1 |   | 8/2004  | Nguyen et al. |

FOREIGN PATENT DOCUMENTS

EP    1 355 038 A1    10/2003

OTHER PUBLICATIONS

International Search Report for PCT/US05/009511, published by the International Bureau of WIPO on Jul. 5, 2005 under WO 2005/100746 A1.
Office Action dated Jul. 10, 2009 for Chinese Application No. 20058005208.X, 6 pages.

* cited by examiner

*Primary Examiner* — Zakiya W. Bates
(74) *Attorney, Agent, or Firm* — Thompson Coburn LLP (57) ABSTRACT

A proppant composition comprises a non-radioactive, detectable tracer at least partially embedded in a ceramic composition. The composition may be prepared by agglomerating granules of the ceramic material and granules of the non-radioactive, detectable material to produce the particle by compression. Backflow of proppants in a fractured subterranean formation into which a plurality of particles of the proppant composition have been introduced may be tracked by analyzing a sample of the backflow by detecting for presence of the tracer in the sample.

22 Claims, 1 Drawing Sheet

Figure 1

TAGGED PROPPING AGENTS AND RELATED METHODS

BACKGROUND OF THE INVENTION

1. Field of the Invention

The present invention relates to propping agents, and more particularly to propping agents that, are labeled to enable detection of the presence of the propping agent.

2. Description of the Related Art

One of the problems encountered in attempting to maximize recovery of hydrocarbons such as crude oil and natural gas from underground formations is the entrapment of hydrocarbons within low permeability formations. In fact, wells often contain large amounts of the hydrocarbon entrapped in such low permeability rock formations. The entrapped hydrocarbon, of course, does not flow readily to the well bore.

Thus, subterranean formations that contain entrapped hydrocarbons are often "fractured" to enhance the recovery of the entrapped hydrocarbon from the formations. Fracturing typically involves the injection of viscosified aqueous or hydrocarbon fluids into the well bore at a rate and pressure in excess of the formation stresses, thereby causing rock fatigue and opening or inducing new fractures in the formation. Fractures are natural or induced fissures or channels in the formation matrix. The injected fluids usually contain a proppant material, commonly referred to as a "propping agent" or simply a "proppant." Proppants are particulate solids such as sand or ceramic particles, which may or may not be coated with another material such as resin. After the exerted injection pressure has been relieved, the fractures, which would otherwise tend to close, are propped open by propping agent left behind in the fracture. More conductive channels are thus provided to allow the oil or gas to flow to the well bore after the injection pressure is relieved.

Frequently, however, a substantial portion of the proppant does not remain in the fractures, but flows back to the well bore. Such proppant flowback not only results in inefficiency due to the failure of the proppant that has flowed back to serve its purpose of propping open the fractures, but also can cause serious wear in the production equipment. In wells that contain more than one zone to which proppant has been delivered it can be very difficult to determine which of the zones may be the source of the proppant flowback problem. Therefore, the proppant flowback problem is particularly troublesome in such wells.

Some techniques have been developed which provide a means to identify the zone or zones that are the source of the proppant flowback. Generally, such techniques involve tagging the proppants with a tracer or marker that can be detected by some standard method. According to such techniques, the proppant delivered to each zone is tagged with a tracer distinct from the tracers associated with the other zones. By detecting which tracer is present in the proppant that has flowed back from the formation, it can then be determined the zone from which the proppant flowed.

However, none of the techniques so far developed are entirely satisfactory. For example, radioactive tracers have been used, but radioactive materials can have a short shelf-life and may be difficult to handle and can be hazardous to the environment. U.S. Pat. No. 6,691,780 discloses a technique for tagging proppants with non-radioactive materials, but that technique employs a tag within a resin coating over the proppant. Thus, the technique is limited to resin-coated proppants and is susceptible to loss of the tags if the coating is lost by friction, heat or other means.

As a result, superior tagged proppants, and methods of producing them, that avoid the aforementioned problems are still needed. In particular, it is desired that the tagged proppant be non-radioactive and be tagged in a way that is not susceptible to loss of the tracer by friction and the like. Moreover, because the proppants must be suspended in the carrier fluid and must withstand substantial forces to prop open fractures, and because the purpose of the proppants is to increase flow-through or "conductivity" of fluids, the tagged proppant should maintain the strength and density of the untagged proppant, and should provide at least a similar conductivity (that is, fluid flow-through) as does the untagged proppant.

SUMMARY OF THE INVENTION

Briefly, therefore, the present invention is directed to a novel proppant composition comprising a non-radioactive, detectable tracer at least partially embedded in a ceramic composition.

The present invention is also directed to a novel method for producing a particle comprising a non-radioactive, detectable material and a ceramic material, the method comprising agglomeration of granules of the ceramic material and granules of the non-radioactive, detectable material to produce the particle by compression.

The present invention is also directed to a novel method for producing a substantially resin-free particle that need not be resin-coated, but may be (if so desired) at least partially coated with resin, comprising agglomeration of granules of the ceramic material and granules of the non-radioactive, detectable material to produce the substantially resin-free particle comprising the non-radioactive, detectable material at least partially embedded in the ceramic material. If a coating is desired, the substantially resin-free particle thus formed may then at least partially coated with a coating material.

The present invention is also directed to a novel method for tracking the backflow of proppants in a fractured subterranean formation into which a plurality of such tagged proppant composition particles have been introduced. According to the method, a sample of the backflow is analyzed by detecting for presence of the tracer in the sample.

Among the several advantages found to be achieved by the present invention, therefore, may be noted the provision of a tag that is integral with the ceramic material rather than associated with the ceramic material by means of a coating; the provision of a proppant that bears such a tag; the provision of such proppant that maintains desirable strength, density and conductivity despite the presence of the tag; the provision of a method for preparing such tagged proppants; and the provision of a method for tracking particulate flowback with such proppants.

Further features and advantages of the present invention, as well as the structure and operation of various embodiments of the present invention, are described in detail below with reference to the accompanying drawing.

DETAILED DESCRIPTION OF THE PREFERRED EMBODIMENTS

In accordance with the present invention, it has been discovered that, surprisingly, a non-radioactive tracer may be embedded in a ceramic proppant without diminishing the strength or conductivity of the proppant or undesirably altering its density. In fact, the proppants can even be tagged according to the methods of this invention to allow different versions of the tagged proppant with identical strengths and densities to be distinguished. Moreover, because the tag is embedded in the ceramic, it is not prone to wearing or flaking off of the proppant due to friction, heat or other causes typically encountered by the proppant. And, because the tracers of the subject invention do not break down like radioactive tracers, they are not hazardous and have virtually unlimited shelf-lives.

While particles comprising or derived from bauxite (low grade or "true" bauxite), kaolin or other particles comprising one or more clays, alumina, silica and mixtures of any of the foregoing have been found particularly suitable for tagging according to the preparation techniques of the present invention, it is believed that any ceramic proppant may be tagged according to the preparation techniques of this invention. Many ceramic materials suitable for proppants are well known. For example, Lunghofer U.S. Pat. No. 5,120,455, Fitzgibbon U.S. Pat. Nos. 4,427,068 and 4,879,181, and patents cited in each of the foregoing patents, identify a variety of proppants and proppant materials, and are incorporated herein by reference. The proppant materials themselves will be referred to herein as "ceramic compositions" in contrast and distinction to the tracer that is applied thereto.

It is believed that the tagged proppant of this invention made be prepared by any standard pelletizing or tabletting technique well known in the proppant manufacture, pelletizing and tabletting arts for agglomerating a powder into a proppant, pellet or tablet, but wherein the powder is a mixture of ceramic composition and tracer, as discussed below, and the resulting particle, pellet or tablet is of appropriate size, shape, strength and density as is well known for suitable proppants. Thus, for example, the tagged proppant may be prepared by continuous spray atomization, spray fluidization, spray drying, or compression. An example of a compression technique is that has been formed to the yield excellent tagged proppants is described in U.S. Pat. No. 4,879,181 for untagged proppants, except that alternative ceramic compositions, as noted above, besides the calcined clay, alumina, bauxite and mixtures thereof may be employed as the ceramic composition in the starting ingredients and a non-radioactive, detectable tracer is mixed with the ceramic starting ingredients, and it is this resulting mixture that is milled, homogenized and pelletized by compression.

The tracer may be any non-radioactive material that is detectable in the proppant, particularly detection by methods that can determine the chemical compositions of samples. For instance, the tracer material may be one that is detectable by inductively-coupled plasma (ICP), X-ray fluorescence, or proton-induced X-ray emission (PIXE). However, other methods that can detect the presence of the tracer, such as the chemical analysis, may be used. Techniques for detecting the presence of certain materials by such methods are well known. Thus, U.S. Pat. No. 6,691,780 describes a method to detect the presence of a tagged proppant by ICP. While the proppant of U.S. Pat. No. 6,691,780 is tagged with a tracer-containing resin coating, the ICP detection technique of that patent is applicable to the tagged proppants of the present invention as well. According to the ICP method of U.S. Pat. No. 6,691,780:

an aqueous sample is nebulized within an ICP spectrophotometer and the resulting aerosol is transported to an argon plasma torch located within the ICP spectrophotometer. The ICP spectrophotomer measures the intensities of element-specific atomic emissions produced when the solution components enter the high-temperature plasma. An on-board computer within the ICP spectrophotomer accesses a standard calibration curve to translate the measured intensities into elemental concentrations. ICP spectrophotometers for use according to the ICP method are generally commercially available from the Thermo ARL business unit of Thermo Electron Corporation, Agilent Technologies and several other companies.

As explained below, other detection techniques, and so tracers, such as noted in U.S. Pat. No. 6,691,780 may be applicable as well, so long as the detection is not dependent on the tracer being exposed in an external coating rather than embedded within the ceramic.

It is also preferred that the material employed as a tracer not be one that is otherwise present in the ceramic composition or at least is present in the composition in a concentration less than about 1,000 ppm based on weight. This is desirable to avoid false concentration measurements resulting from interference from the material present in the ceramic composition and, in the case of multi-zone formations, to avoid false measurements resulting from the presence of the material from proppants flowing back from other zones. Generally, it is believed that the tracer may be any substance, particularly a solid, that is detectable by chemical analysis at a concentration in the proppant (especially when the proppant is present in the sample to be tested at the lowest concentration at which the proppant desired to be detected) that does not degrade the physical properties of the proppant with respect to density, strength and conductivity.

Based on such considerations, ceramic forms of certain metals have been found to be especially good tracer materials. Examples of such preferred metals include the lanthanide series of rare earth metals, strontium, barium, gallium, germanium, and combinations thereof, particularly, lanthanum, cerium, strontium, barium, gallium, germanium, tantalium, zirconium, vanadium, chromium, manganese, and combinations thereof, especially lanthanum, cerium, and combinations thereof. Although the metals may be employed in elemental form, some metals in their metallic form are hazardous and it is contemplated that more commonly compounds containing the metals, such as the ceramic forms (oxides, hydroxides and carbonates) of the metals will be used. Thus, references herein to the metals themselves shall be taken in their broadest sense and so include the molecular, ionic, and mineralogical forms of the metals. Of course, for multi-zone applications where it is desirable to distinguish the zones from which proppant has flowed back, it is desirable for the tracers to be not just detectable, but detectable in a way that one type can be distinguished from the others used for other zones.

Moreover, combinations of types of tracers are particularly useful for application to subterranean formations in which the number of zones in the formation exceeds the number of different available types of tracers. In such situations, a plurality of different types of tracers may be combined to produce a distinct tracer defined by the combination. By way of illustration, if sixteen different types of tracers are available, four of the types of tracers may be designated, say, A-D, while the remaining eleven may be designated, say, 1-12. By pairing the tracer types, forty-eight different tracers in the form of tracer combinations A1, A2, . . . B1, B2, and so forth can be used to distinguish forty-eight different zones. As is now apparent, by combining the tracer types in different ways, many different zones may be distinguished with a limited number of types of tracers.

Certain techniques can be employed to avoid confusion that might otherwise arise from mixing tracers. For example, if the backflow contains tracers A1, A2, B1 and B2, it may be difficult from the detection of tracer types A, B, 1 and 2 to determine how much of the tracer type A is from the zone associated with A1 and how much is associated with A2. The presence of additional amounts of tracer types 1 and 2 from the tracers B1 and B2 might interfere or complicate the ability to distinguish between A1 and A2 base on the amounts of tracer types 1 and 2 detected. However, the tracer combinations may be assigned to disparate zones that would be unlikely to intermingle backflows, thereby avoiding such overlaps.

The amount of tracer that is desirable to mix with the ceramic composition depends on a variety of circumstances. Nevertheless, the concentration of the tracer in the proppant should be sufficient so that its presence in the backflow will be detectable by the selected detection method when the amount of proppant in the backflow is at a level at which detection of its presence is desired. It also is desired that the concentration of the tracer in the proppant not be substantially above that level, as the use of more tracer can result in higher cost and, in some circumstances, might degrade the desirable qualities of the proppant. Generally, tracer concentrations of at least about 0.03% by weight are desired for convenient detection by conventional detection techniques, while in some situations tracer concentrations in excess of 0.15%, and especially in excess of 0.2%, by weight have been found to change the firing temperature significantly and may even degrade the properties of lightweight proppants. Thus, generally, it has been found that tracer concentrations of from about 0.005 to about 0.5, preferably about 0.01 to about 0.3, more preferably from about 0.03 to about 0.2, even more preferably from about 0.03 to about 0.15, such as from about 0.05 to about 0.15, typically about 0.13, percent by weight, based on the weight of the ceramic composition, are particularly useful. In situations in which a combination of tracer types is used, each type should be in a concentration sufficient to be detectable at the level of proppant desired to be detected. Generally, in such situations, each type of tracer should be present in a concentration of at least about 0.005 percent, preferably at least about 0.01 percent, more preferably at least about 0.02, and even more preferably at least about 0.03 percent by weight based on the weight of the ceramic composition. In any event, however, the minimum concentration depends on the sensitivity of the method of chemical analysis and so it is possible that concentrations even lower than 0.01 percent may be used with some analytical techniques. For example, neutron activation analysis (NAA) is reported to be able to have detection limits of 1-5 ppm (or 0.0001-0.0005 wt %) for $La_2O_3$ and $CeO_2$, which would allow detection (and so concentration levels) in the range of 0.001 wt %.

As noted above, the tagged proppant may be prepared in the manner described in U.S. Pat. No. 4,879,181 for untagged proppants, except that, in the present invention, the tracer is included as part of the starting proppant ingredients. Therefore, it is contemplated that tagged proppants according to the subject invention will be prepared typically by agglomeration of granules of the ceramic material and granules of the non-radioactive, detectable material to produce the particle, whether by compression or some other agglomeration means. For example, a mixture of fine grains of the ceramic composition and of the tracer can be compressed together to form a proppant particle. Thus, briefly but in more detail, the tagged proppant may be prepared as follows.

Starting materials for the ceramic composition (such as calcined clay and alumina, bauxite, or mixtures thereof or other ingredients as discussed above as suitable proppant materials), may be added to a high intensity mixer, such as a ball mill, in a predetermined ratio with the tracer in a concentration as discussed above. The additives to the mixer then may be milled to a fine powder, which is then stirred to form a dry homogeneous particulate mixture. For example, the powder may be stirred with a stirring or mixing device that is obtainable from Eirich Machines, Inc., known as an Eirich Mixer. Similar mixing equipment is available from other manufacturers. While the mixture is being stirred, sufficient water to cause formation of composite, spherical pellets from the ceramic powder mixture may be added. The resulting pellets may be dried and the dried pellets then fired at sintering temperature for a period sufficient to enable recovery of sintered, spherical pellets having an apparent specific gravity of, for instance, between 2.70 and 3.60 and a bulk density of, for instance, from about 1.0 to about 2.0 grams per cubic centimeter. The specific time and temperature to be employed is, of course, dependent on the starting ingredients and is determined empirically according to the results of physical testing of pellets after firing. The resulting pellets may be screened to produce proppants within a size range of, for example, about 40 mesh to about 20 mesh, from about 16 mesh to about 20 mesh, from about 30 mesh to about 50 mesh, from about 30 mesh to about 60 mesh, or from about 16 mesh to about 30 mesh. More specific details of this process are discussed in U.S. Pat. No. 4,879,181.

Other known methods of preparing proppants may be modified similarly to prepare the tagged proppants of the subject invention. Thus, for example, it is believed that alternative methods of preparation may be according to similarly modified processes described in U.S. Pat. No. 4,440,866 and referred to in U.S. Pat. No. 5,120,455. These patents, including the patents referred to in U.S. Pat. No. 5,120,455, are incorporated herein by reference.

The resulting tagged proppant, therefore, comprises a non-radioactive, detectable tracer at least partially embedded in a ceramic composition. The tagged proppant may be prepared from a mixture of powdered ceramic composition and powdered tracer and so comprises not a discrete tracer-containing coating over a tracer-free ceramic particle, but a mixture—an agglomeration—of the ceramic composition and the tracer. In fact, at least some of the tracer is at least partially—and may be completely—surrounded by ceramic composition. Thus, the tracer does not tend to rub off of the proppant. And surprisingly, it has been found that tagging the proppants according to the method of the present invention does not degrade the strength, density or conductivity of the proppants. Moreover, because the tracer of the proppant particle is thus in contact with the ceramic composition, in fact, adhered directly to the ceramic composition, it need not be applied by coating the particle with a resin containing the tracer. Although the proppant composition may be substantially or completely free of resin, it may also be coated partially or completely with a coating material such as resin if so desired, and the coating may be substantially or completely free of the tracer. As discussed above, the tracer may comprise a plurality of distinct types of tracers, generally distinct types of tracer metals.

The tagged proppant of the present invention may be used in place of prior art proppants, and particularly in place of prior art tagged compositions to determine whether and how much proppant is flowing back from one or a plurality of zones within a subterranean formation. In fact, the fact that the tagged proppants of the present invention are not radioactive, are strong, need not bear a resin-coating, and so forth, may permit employment of such proppants in situations in which conventional proppants are not useful or practical. Moreover, in the case of multiple zones, it is possible, with the tagged proppants of the present invention, to identify which zone or zones are associated the flowback.

In short, a subterranean formation having one or multiple zones may be treated and backflow from the zone(s) tracked by introducing tagged proppant into a well bore in the formation, for example, by way of a fracturing fluid to fracture the well by standard techniques except for the replacement of convention (tagged or untagged) proppants with the tagged proppants of the present invention. In the case of a multi-zone formation, a plurality of types of tagged proppants, each type of proppant tagged with a tracer distinguishable from tracers of the other types of tagged proppants, may be employed by directing each of the types of proppants to a different zone. As explained above, a plurality of tracers may be a plurality of combinations of types of tracers. Flowback from one or more of the zones may then be analyzed, such as by collecting at least a portion of the flowback, and the proppants (and so zones) associated with the flowback identified by detecting the tracer(s) therein.

The following examples describe the preferred embodiments of the invention. Other embodiments within the scope of the claims herein will be apparent to one skilled in the art from consideration of the specification or practice of the invention as disclosed herein. It is intended that the specification together with the examples, be considered exemplary only, with the scope and spirit of the invention being indicated by the claims which follow the examples. Percentages identified in the examples are based on weight.

Example 1

Tests were carried out to investigate whether low addition levels of tracers to a bauxite-based proppant would change the final physical properties required of a high strength proppant. Two different markers (lanthanum oxide and cerium oxide) were lab tested. Batches of the untagged proppant were made in the lab with and without marker additions. Testing of the resulting bulk density, apparent specific gravity, crush at 15 kpsi, and conductivity showed no degradation in physical properties for batches with either of the two marker additions compared to the batch without a marker addition.

Example 2

Because lab produced proppant samples can have improved properties due to the increased control of the process that is possible in a lab setting with high precision lab equipment, control batches of the proppant of Example 1, above, without any tracer additions were made along with batches with tracer additions to give a more direct comparison of properties of the proppant.

One batch of the bauxite-based raw material was ground in the lab without any tracers. Additional batches were blended with a tracer and then milled in the lab to make a homogeneous blend. Each batch was made into pellets and sintered in a lab kiln. Each batch of sintered pellets was sized to the following sieve distribution:

| U.S. Mesh | % Retained |
|---|---|
| +16 | 0 |
| −16 +20 | 3.6 |
| −20 +25 | 34.7 |
| −25 +30 | 47.0 |
| −30 +35 | 14.0 |
| −35 +40 | 0.7 |
| −40 +50 | 0 |
| −50 | 0 |

Density, strength, and conductivity testing was performed on each batch according to API specifications. Specific gravity was measured using a Micromeritics Helium Pycnometer.

The following table shows the density and crush strength for the proppant with tracer A (lanthanum oxide) for two different trials at a concentration level of 0.03% and the proppant with tracer B (cerium oxide) at a concentration level of 0.03%.

|  | Control Batch | Tracer A 0.03% | Tracer A 0.03% | Tracer B 0.03% |
|---|---|---|---|---|
| Specific Gravity | 3.64 | 3.65 | 3.64 | 3.65 |
| B.D. (g/cc) | 1.99 | 2.02 | 2.02 | 1.99 |
| A.S.G. | 3.65 | 3.67 | 3.66 | 3.67 |
| Crush @ 15 kpsi (%) | 2.4 | 2.9 | 2.2 | 3.0 |

Figure 1:
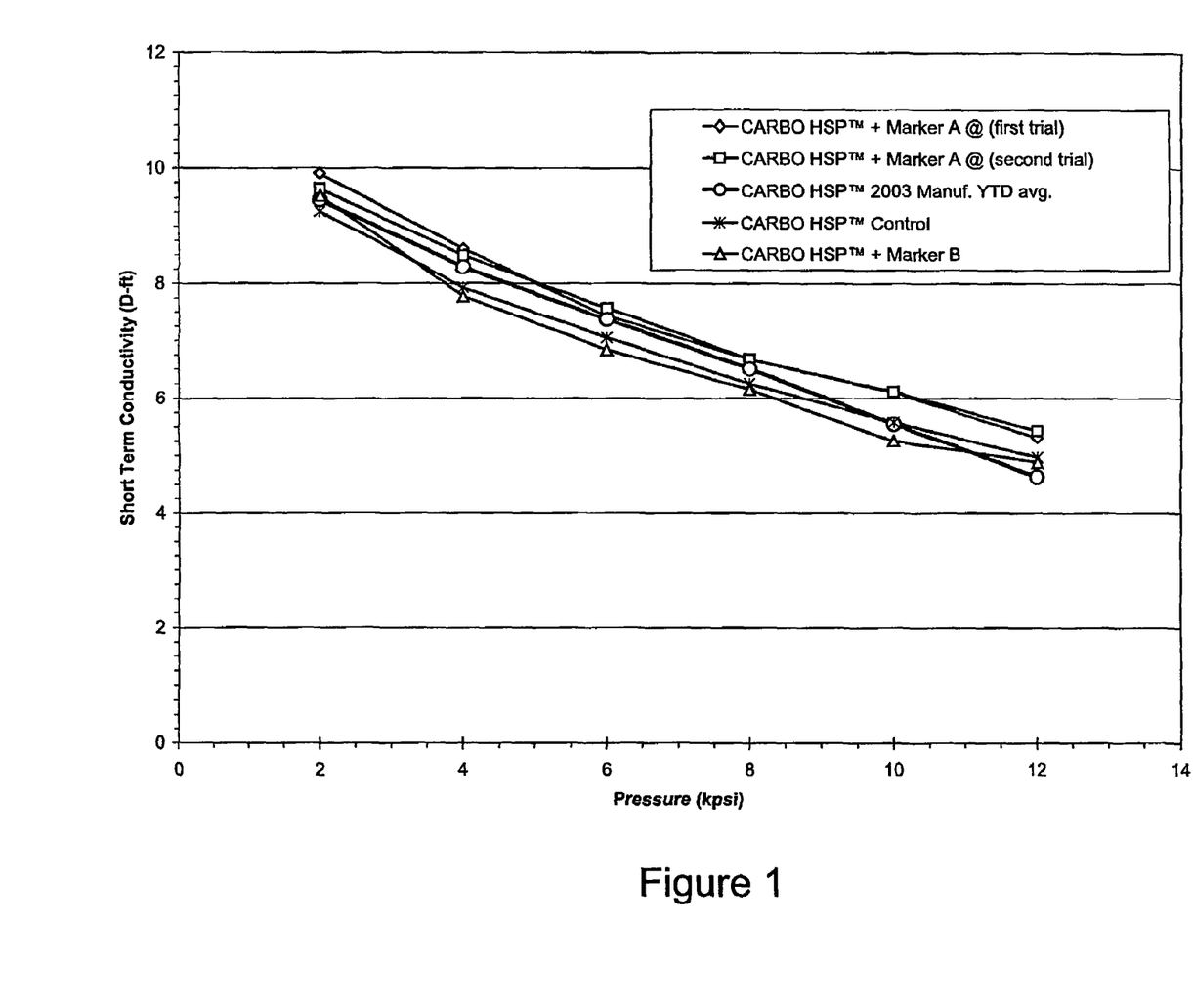
FIG. 1 is a graph of the conductivity for an untagged proppant compared to that of the proppant tagged with a tracer "A" and that of the proppant tagged with a tracer "B," wherein tracer "A" is lanthanum oxide and wherein tracer "B" is cerium oxide.

The conductivities of all four batches of the proppant are shown in FIG. 1. The density and crush strength data and conductivity data are within the experimental error for each test and consequently demonstrate that there is no measurable degradation in the properties of the proppant when either tracer A or tracer B are added in a concentrations of 0.03%.

Example 3

Samples were sent to two outside labs for X-Ray Fluorescence (XRF) and Inductively Coupled Plasma (ICP) analysis. Redundant samples were sent to each lab and all samples were identified only with a generic, sequential identification number (for XRF 001 . . . 015 and for ICP 001 . . . 010). XRF & ICP on the control batches measured the background concentration (in wt %) of tracers A and B as described in Example 2, above. XRF and ICP analyses of the batches with tracer A or B, measured the total concentration (in wt %) of tracers A and B.

For the tagged batches with markers A or B added at a concentration level of 0.03 wt %, the resulting chemistry measured via XRF was:

Background concentration of tracer A in six control batch samples: 0.00%±0.01

Total measured concentration of tracer A in five marked batch samples: 0.02%±0.01

Background concentration of tracer B in six control batch samples: 0.01%±0.01

Total measured concentration of tracer B in three marked batch samples: 0.04%±0.01

For the tagged batches with tracers A or B added at a concentration level of 0.03%, the resulting chemistry measured via ICP was:

Background concentration of tracer A in four control batch samples: 0.003%±0.001

Total measured concentration of tracer A in four marked batch samples: 0.032%±0.001

Background concentration of tracer B in four control batch samples: 0.030%±0.010

Total measured concentration of tracer B in two marked batch samples: 0.051%±0.001

Both XRF and ICP analysis was able to detected the presence of the tracers within at least 0.01%.

All references cited in this specification, including without limitation all journal articles, brochures, manuals, periodicals, texts, manuscripts, website publications, and any and all other publications, are hereby incorporated by reference. The discussion of the references herein is intended merely to summarize the assertions made by their authors and no admission is made that any reference constitutes prior art. Applicants reserve the right to challenge the accuracy and pertinence of the cited references.

In view of the above, it will be seen that the several advantages of the invention are achieved and other advantageous results are obtained.

As various changes could be made in the above methods and compositions without departing from the scope of the invention, it is intended that all matter contained in the above description and shown in the accompanying drawings shall be interpreted as illustrative and not in a limiting sense.

Example 4

Each of several samples of ground Comalco Bauxite were blended with no (control) or a particular rare earth additive or other ceramic additive not found in the bauxite in appreciable quantities in a Lab Eirich mixer for ten minutes. The blends were then jet milled to reduce particle size to a powder and to mix the components intimately. The powders were pelletized to green pellets and sieved to the −16 to +40 sieve range. Two samples of pellets formed from each blend were sent to a lab for analysis by inductively coupled plasma (ICP). On other green pellets from each blend, three boats of each were sieved to the −16 to +40 sieve range, fired to peak temperature (about 1500° C.) at 960° C./hr. with a hold of about thirty minutes.

The ICP analysis showed that the presence of the taggant of concentration higher than that inherently present (that is, the background level of the taggant in untreated proppant as represented by the control) could be detected. In the following table, the first number in the column labeled "Background Level of the Taggant Composition" is the concentration (in wgt. %) of the taggant composition measured in the untreated control for samples in the form of green pellet samples and the second number is for samples in the form of dust. The first number in the column labeled "Measured Level of Taggant" is the concentration (in wgt. %) of the taggant composition measured in the proppant to which the taggant has been added is for samples in the form of green pellet samples and the second number is for samples in the form of dust. The column labeled "Difference" is the difference between the average concentration of taggant measured for taggant composition and the average background concentration of the taggant composition measured in control samples. For each tagged proppant, 0.1% taggant was added, except for $ZrSiO_4$, in which case, 0.25% was added.

| Taggant | Background Level of Taggant Composition | Measured Level of Taggant | Difference |
|---|---|---|---|
| $ZrSiO_4$ | 0.18, 0.20 | 0.36, 0.36 | 0.15 |
| ZnO | 0.001, 0.001 | 0.092, 0.091 | 0.085 |
| $SrO(CO_2)$ | 0.002, 0.002 | 0.10, 0.11 | 0.10 |
| $Nd_2O_5$ | 0.002, 0.002 | 0.12, 0.11 | 0.11 |
| $Pr_6O_{11}$ | 0.002, 0.002 | 0.10, 0.099 | 0.98 |
| MnO | 0.015, 0.018 | 0.10, 0.097 | 0.083 |
| CuO | 0.002, 0.001 | 0.10, 0.098 | 0.097 |
| $Cr_2O_3$ | 0.002, 0.042 | 0.15, 0.15 | 0.12 |
| NiO | 0.001, 0.001 | 0.95, 0.10 | 0.096 |
| $V_2O_5$ | 0.014, 0.009 | 0.12, 0.13 | 0.12 |
| $Co_3O_4$ | 0.004, 0.003 | 0.13, 0.14 | 0.13 |
| $Sb_2O_3$ | 0.002, 0.002 | 0.086, 0.092 | 0.087 |

Similar tests were conducted on other samples comparing % added $La_2O_3$ with the results of the % $La_2O_3$ measured, compared to controls in which no $La_2O_3$ was added, as follows:

| | % $La_2O_3$ Measured | |
|---|---|---|
| % $La_2O_3$ Added | In Control | In Tagged Proppant |
| 0.15 | 0.004 | 0.11 |
| 0.15 | 0.004 | 0.12 |
| 0.03 | under 0.005 | 0.02 |
| 0.15 | under 0.005 | 0.018 |
| 0.03 | — | 0.017 |
| 0.15 | — | 0.018 |
| 0.03 | under 0.005 | 0.02 |
| 0.15 | under 0.005 | 0.018 |
| 0.15 | — | 0.024 |
| 0.15 | — | 0.024 |
| 0.15 | — | 0.11 |
| 0.15 | — | 0.10 |

The tests were repeated for $CeO_2$, with the following results:

| | % $La_2O_3$ Measured | |
|---|---|---|
| % $La_2O_3$ Added | In Control | In Tagged Proppant |
| 0.03 | 0.010 | 0.041 |
| 0.03 | 0.019 | 0.039 |
| 0.03 | — | 0.041 |
| 0.15 | — | 0.13 |
| 0.03 | — | 0.12 |

Further tests were carried out using X-Ray Fluorescence (XRF) with the following measured $La_2O_3$ concentrations for no additive and for 0.03% and 0.15% $La_2O_3$ and $CeO_2$ added:

| | $La_2O_3$: | |
|---|---|---|
| Control | 0.03% $La_2O_3$ Added | 0.15% $La_2O_3$ Added |
| Under 0.005 | 0.020 | 0.11 |
| Under 0.005 | 0.018 | 0.10 |
| Under 0.005 | 0.017 | |
| Under 0.005 | 0.018 | |
| Under 0.005 | 0.020 | |
| Under 0.005 | 0.018 | |
| Under 0.005 | 0.024 | |
| Under 0.005 | 0.024 | |

$CeO_2$:

| Control | 0.03% $CeO_2$ Added | 0.15% $CeO_2$ Added |
|---|---|---|
| 0.008 | 0.010 | 0.13 |
| 0.008 | 0.039 | 0.12 |
| 0.011 | 0.041 | |

Further tests were carried out using ICP with the following measured concentrations for no additive and for 0.03% and 0.15% $La_2O_3$ and $CeO_2$ added:

$La_2O_3$:

| Control | 0.03% $La_2O_3$ Added | 0.15% $La_2O_3$ Added |
|---|---|---|
| 0.003 | 0.032 | 0.14 |
| 0.003 | 0.032 | 0.14 |
| 0.003 | 0.032 | |
| 0.003 | 0.032 | |
| 0.003 | 0.027 | |
| 0.003 | 0.030 | |

$CeO_2$:

| Control | 0.03% $CeO_2$ Added | 0.15% $CeO_2$ Added |
|---|---|---|
| 0.028 | 0.051 | 0.16 |
| 0.030 | 0.050 | 0.16 |

The resulting pellets also were analyzed for bulk density by the standard ANSI test, apparent specific gravity by the standard API test, specific gravity by Helium Picnometer, and crush strength at 15 ksi by the standard API test. The following results were obtained, where the measured content of the taggant was determined by ICP:

| Taggant Added | Bulk Density (gm/cc) | Crushed (%) | Specific Gravity Apparent | Specific Gravity Actual | Short Term Conductivity (Darcy-ft) 2 ksi | 4 ksi | 6 ksi | 8 ksi | 10 ksi | 12 ksi | Measured Content of Taggant In Control | In Taggant Proppant |
|---|---|---|---|---|---|---|---|---|---|---|---|---|
| Control | 1.99 | 2.4 | 3.65 | 3.6422 | 9.26 | 7.93 | 7.05 | 6.25 | 5.58 | 4.96 | N/A | N/A |
| 0.03% $CeO_2$ | 1.99 | 3.0 | 3.67 | 3.653 | 9.53 | 7.78 | 6.84 | 6.15 | 5.25 | 4.88 | 0.026 | 0.0505 |
| 0.15% $CeO_2$ | 2.01 | 3.42 | 3.60 | 3.6564 | 9.17 | 8.04 | 7.22 | 6.10 | 5.33 | 4.75 | | |
| 0.15% $CeO_2$ | 2.01 | 3.82 | 3.60 | 3.6564 | | | | | | | | |
| 0.15% $CeO_2$ | 2.01 | 4.22 | 3.61 | 3.6667 | | | | | | | | |
| 0.15% $CeO_2$ | 2.04 | 5.16 | 3.64 | 3.6581 | | | | | | | | |
| 0.15% $CeO_2$ | 2.04 | 2.18 | 3.63 | 3.6667 | 10.74 | 9.07 | 7.74 | 6.92 | 6.30 | 5.47 | 0.026 | 0.160 |
| 0.15% $CeO_2$ | 2.02 | 4.35 | 3.64 | 3.6453 | | | | | | | | |
| 0.15% $CeO_2$ | 2.02 | 3.61 | 3.61 | 3.6352 | | | | | | | | |
| 0.03% $La_2O_3$ | 2.02 | 2.9 | 3.67 | 3.6488 | 9.91 | 8.61 | 7.43 | 6.67 | 6.10 | 5.31 | 0.003 | 0.031 |
| 0.15% $La_2O_3$ | 2.05 | 2.96 | 3.60 | 3.6638 | 8.77 | 6.83 | 5.91 | 5.45 | 4.82 | 4.38 | | |
| 0.15% $La_2O_3$ | 2.05 | 3.75 | 3.55 | 3.6678 | | | | | | | | |
| 0.15% $La_2O_3$ | 2.06 | 3.93 | 3.64 | 3.6588 | | | | | | | | |
| 0.15% $La_2O_3$ | 2.03 | 3.00 | 3.64 | 3.6577 | 10.42 | 7.80 | 6.85 | 6.27 | 5.44 | 4.77 | 0.003 | 0.140 |
| 0.15% $La_2O_3$ | 2.06 | 3.38 | 3.66 | 3.6547 | | | | | | | | |
| 0.15% $La_2O_3$ | 2.06 | 2.75 | 3.64 | 3.6446 | | | | | | | | |
| Control | 2.04 | 3.77 | 3.64 | 3.6486 | | | | | | | | |
| Control | 2.00 | 2.83 | 3.60 | 3.6365 | | | | | | | | |
| Control | 1.97 | 3.09 | 3.59 | 3.6251 | 8.90 | 7.66 | 6.73 | 6.07 | 5.48 | 4.92 | N/A | N/A |
| 0.10% ZnO | 2.04 | 3.77 | 3.64 | 3.6603 | 9.60 | 8.19 | 7.35 | 6.65 | 5.91 | 5.33 | 0.007 | 0.092 |
| 0.10% ZnO | 2.01 | 3.82 | 3.60 | 3.6538 | | | | | | | | |
| 0.25% $ZrSiO_4$ | 2.04 | 4.17 | 3.65 | 3.6619 | | | | | | | | |
| 0.25% $ZrSiO_4$ | 2.02 | 3.61 | 3.67 | 3.6587 | 9.40 | 8.08 | 7.38 | 6.54 | 5.74 | 5.24 | 0.21 | 0.36 |
| 0.25% $ZrSiO_4$ | 2.02 | 3.81 | 3.64 | 3.6551 | | | | | | | | |
| 0.10% $SrO(CO_2)$ | 2.05 | 2.96 | 3.65 | 3.6488 | 8.61 | 7.30 | 6.64 | 5.90 | 5.40 | 4.68 | 0.002 | 0.105 |
| 0.10% $SrO(CO_2)$ | 2.02 | 3.41 | 3.61 | 3.6471 | | | | | | | | |
| 0.10% $Nd_2O_3$ | 2.01 | 3.82 | 3.63 | 3.6689 | 9.08 | 7.73 | 6.67 | 5.94 | 5.13 | 4.59 | 0.002 | 0.115 |
| 0.10% $Nd_2O_3$ | 2.02 | 4.0 | 3.65 | 3.6639 | | | | | | | | |
| 0.10% $Pr_6O_{11}$ | 2.04 | 3.17 | 3.65 | 3.6591 | 8.78 | 7.72 | 6.82 | 6.04 | 5.48 | 4.64 | 0.002 | 0.100 |
| 0.10% $Pr_6O_{11}$ | 2.03 | 3.59 | 3.64 | 3.6577 | | | | | | | | |
| 0.10% $MnO_2$ | 2.04 | 2.40 | 3.64 | 3.6534 | | | | | | | | |
| 0.10% $MnO_2$ | 2.03 | 2.19 | 3.64 | 3.6458 | 9.46 | 8.21 | 7.31 | 6.48 | 5.81 | 5.41 | 0.016 | 0.099 |
| 0.10% Red $CuO_2$ | 2.03 | 1.99 | 3.64 | 3.6644 | 9.65 | 8.72 | 7.58 | 6.85 | 6.35 | 5.67 | 0.002 | 0.099 |
| 0.10% Red $CuO_2$ | 2.04 | 2.38 | 3.64 | 3.6574 | | | | | | | | |
| 0.10% $Cr_2O_3$ | 2.06 | 2.95 | 3.65 | 3.6623 | 9.28 | 7.97 | 7.26 | 6.54 | 5.86 | 5.34 | 0.034 | 0.15 |
| 0.10% $Cr_2O_3$ | 2.05 | 2.96 | 3.63 | 3.6643 | | | | | | | | |
| 0.10% $Cr_2O_3$ | 2.03 | 3.78 | 3.63 | 3.653 | | | | | | | | |
| Control | 1.96 | 3.63 | 3.59 | 3.6047 | 9.33 | 8.14 | 7.29 | 6.49 | 5.68 | 5.07 | N/A | N/A |
| Control | 1.95 | 3.94 | 3.56 | 3.5946 | | | | | | | | |
| 0.10% $Ni_2O_3$ | 2.02 | 1.60 | 3.64 | 3.6522 | 10.26 | 8.64 | 7.57 | 7.04 | 6.05 | 5.48 | 0.002 | 0.096 |
| 0.10% $Ni_2O_3$ | 2.02 | 3.60 | 3.60 | 3.6487 | | | | | | | | |
| 0.10% $Ni_2O_3$ | 2.01 | 2.21 | 3.56 | 3.6440 | | | | | | | | |
| 0.10% $V_2O_5$ | 2.00 | 2.73 | 3.64 | 3.6474 | | | | | | | | |
| 0.10% $V_2O_5$ | 1.99 | 2.77 | 3.61 | 3.636 | | | | | | | | |
| 0.10% $V_2O_5$ | 1.99 | 2.42 | 3.60 | 3.6315 | 8.85 | 7.70 | 6.85 | 6.06 | 5.44 | 4.76 | 0.009 | 0.116 |
| 0.10% $Co_2O_3$ | 2.06 | 2.55 | 3.59 | 3.6548 | | | | | | | | |
| 0.10% $Co_2O_3$ | 2.04 | 2.42 | 3.61 | 3.6436 | | | | | | | | $Co_3O_4$ |
| 0.10% $Co_2O_3$ | 2.03 | 2.06 | 3.57 | 3.6402 | 9.78 | 8.26 | 7.55 | 6.73 | 6.13 | 5.36 | 0.004 | 0.131 |
| 0.10% $Sb_2O_3$ | 2.02 | 3 | 3.65 | 3.6503 | 9.11 | 7.67 | 6.95 | 6.26 | 5.69 | 5.10 | 0.002 | 0.087 |
| 0.10% $Sb_2O_3$ | 1.98 | 3.1 | 3.56 | 3.6325 | | | | | | | | |
| 0.10% $Sb_2O_3$ | 1.98 | 3.67 | 3.56 | 3.6325 | | | | | | | | |

Example 5

The process of Example 4 was repeated, but with kaolin-based pellets instead of bauxite-based pellets. The results were as follows:

| Taggant Added | Bulk Density (gm/cc) | Crushed (%) | Specific Gravity Apparent | Specific Gravity Actual | Short Term Conductivity (Darcy-ft) 2 ksi | 4 ksi | 6 ksi | 8 ksi | 10 ksi | 12 ksi | Measured Content of Taggant In Control | In Taggant Proppant |
|---|---|---|---|---|---|---|---|---|---|---|---|---|
| Control | 1.53 | 7.90 | 2.75 | 2.7649 | | | | | | | | |
| Control | 1.56 | 5.70 | 2.79 | 2.7899 | 8.71 | 7.04 | 5.61 | 4.17 | 3.01 | 2.12 | 0.004 | N/A |
| Control | 1.55 | 7.83 | 2.80 | 2.7868 | | | | | | | | |
| 0.15% La$_2$O$_3$ | 1.54 | 8.92 | 2.77 | 2.7794 | | | | | | | | |
| 0.15% La$_2$O$_3$ | 1.57 | 6.96 | 2.78 | 2.7807 | 9.65 | 7.95 | 6.29 | 4.48 | 3.26 | 2.22 | 0.004 | 0.115 |
| 0.15% La$_2$O$_3$ | 1.55 | 7.45 | 2.78 | 2.7842 | | | | | | | | |
| 0.15% La$_2$O$_3$ | 1.55 | 10.23 | 2.79 | 2.7704 | | | | | | | | |

What is claimed is:

1. A method for tracking the backflow of proppants in a fractured subterranean formation into which a plurality of proppant composition particles comprising a non-radioactive, detectable tracer uniformly distributed in a ceramic composition have been introduced, comprising analyzing a sample of the backflow by detecting for presence of the tracer in the sample.

2. A method as set forth in claim 1 wherein the subterranean formation has a plurality of zones and the backflow is tracked by introducing a plurality of types of said proppant composition particles, wherein each type of proppant composition particles is tagged with a tracer distinguishable from tracers of the other types of proppant composition particles, directing each of the types of proppant composition particles to a different zone, analyzing a sample of the flowback from at least one of the zones by detecting for presence of each of the tracers, and thereby identifying the type of proppant composition particles associated with the flowback.

3. A method as set forth in claim 2 wherein at least one of the tracers is a combination of types of tracers.

4. A method as set forth in claim 1 wherein the presence of the tracer is detected by X-ray fluorescence, inductively-coupled plasma, or proton-induced X-ray emission.

5. A method as set forth in claim 1 wherein the non-radioactive, detectable tracer is selected from the group consisting of lanthanides, strontium, barium, gallium, germanium, tantalum, zirconium, vanadium, chromium, manganese and combinations thereof.

6. A method as set forth in claim 1 wherein the non-radioactive, detectable tracer is selected from the group consisting of lanthanum, cerium, strontium, barium, gallium, germanium, and combinations thereof.

7. A method as set forth in claim 1 wherein the non-radioactive, detectable tracer is selected from the group consisting of lanthanum, cerium, and combinations thereof.

8. A method as set forth in claim 1 wherein the proppant composition particles are substantially free of resin.

9. A method as set forth in claim 1 wherein the proppant composition particles consist essentially of the non-radioactive, detectable tracer uniformly distributed in a ceramic composition.

10. A method as set forth in claim 1 wherein the non-radioactive, detectable tracer is in contact with the ceramic composition.

11. A method as set forth in claim 1 wherein the proppant composition particles are at least partially coated with a coating material.

12. A method as set forth in claim 11 wherein the coating material is resin.

13. A method as set forth in claim 1 wherein the proppant composition particles are of a size that is selected from the group consisting of (a) from about 20 mesh to about 40 mesh, (b) from about 16 mesh to about 20 mesh, (c) from about 30 mesh to about 50 mesh, (d) from about 30 mesh to about 60 mesh, and (e) from about 16 mesh to about 30 mesh.

14. A method as set forth in claim 1 wherein the tracer makes up about 0.03 to about 0.2 percent by weight of the composition of the proppant composition particles.

15. A method as set forth in claim 1 wherein the non-radioactive, detectable tracer is not present in the ceramic composition or is present in the ceramic composition in a concentration that is less than about 1,000 ppm based on weight.

16. A method for tracking the backflow of proppants in a fractured subterranean formation into which a plurality of proppant composition particles comprising a non-radioactive, detectable tracer uniformly distributed in a ceramic composition have been introduced, comprising analyzing a sample of the backflow by detecting for presence of the tracer in the sample; wherein:
   (a) the non-radioactive, detectable tracer is selected from the group consisting of lanthanides, strontium, barium, gallium, germanium, tantalum, zirconium, vanadium, chromium, manganese and combinations thereof;
   (b) the proppant composition particles are of a size that is selected from the group consisting of (i) from about 20 mesh to about 40 mesh, (ii) from about 16 mesh to about 20 mesh, (iii) from about 30 mesh to about 50 mesh, (iv) from about 30 mesh to about 60 mesh, and (v) from about 16 mesh to about 30 mesh; and
   (c) the tracer makes up about 0.03 to about 0.2 percent by weight of the composition of the proppant composition particles.

17. A method as set forth in claim 16 wherein the proppant composition particles consist essentially of the non-radioactive, detectable tracer at least partially embedded uniformly distributed in a ceramic composition.

18. A method as set forth in claim 17 wherein the non-radioactive, detectable tracer is not present in the ceramic composition or is present in the ceramic composition in a concentration that is less than about 1,000 ppm based on weight.

19. A method as set forth in claim 18 wherein the non-radioactive, detectable tracer is selected from the group consisting of lanthanum, cerium, strontium, barium, gallium, germanium, and combinations thereof.

20. A method as set forth in claim 19 wherein the nonradioactive, detectable tracer is selected from the group consisting of lanthanum, cerium, and combinations thereof.

21. A method as set forth in claim 16 wherein the subterranean formation has a plurality of zones and the backflow is tracked by introducing a plurality of types of said proppant composition particles, wherein each type of proppant composition particles is tagged with a tracer distinguishable from tracers of the other types of proppant composition particles, directing each of the types of proppant composition particles to a different zone, analyzing a sample of the flowback from at least one of the zones by detecting for presence of each of the tracers, and thereby identifying the type of proppant composition particles associated with the flowback.

22. A method as set forth in claim 21 wherein at least one of the tracers is a combination of types of tracers.

* * * * *

UNITED STATES PATENT AND TRADEMARK OFFICE
CERTIFICATE OF CORRECTION

PATENT NO. : 7,921,910 B2  Page 1 of 1
APPLICATION NO. : 11/667324
DATED : April 12, 2011
INVENTOR(S) : Brett A. Wilson et al.

It is certified that error appears in the above-identified patent and that said Letters Patent is hereby corrected as shown below:

At claim 17, line 59, please delete "at least partially embedded"

Signed and Sealed this
Twenty-eighth Day of June, 2011

David J. Kappos
*Director of the United States Patent and Trademark Office*